United States Patent [19]
Yavorsky et al.

[11] 3,718,691
[45] Feb. 27, 1973

[54] REDUCTION OF AQUEOUS THIOSULFATE SOLUTIONS CONTAINING FORMATE WITH CARBON MONOXIDE

[75] Inventors: Paul M. Yavorsky, Monongahela; Everett Gorin, Pittsburgh, both of Pa.

[73] Assignee: Consolidation Coal Company, New York, N.Y.

[22] Filed: April 12, 1972

[21] Appl. No.: 243,259

Related U.S. Application Data

[60] Division of Ser. No. 128,750, March 29, 1971, Pat. No. 3,687,614, which is a continuation-in-part of Ser. No. 879,224, Nov. 24, 1969, Pat. No. 3,584,042, which is a continuation-in-part of Ser. No. 667,479, Sept. 13, 1967, abandoned.

[52] U.S. Cl. ....................260/542, 23/63, 23/115, 23/181
[51] Int. Cl. ............................................C07c 51/00
[58] Field of Search ..................260/542; 23/63, 181

[56] References Cited

UNITED STATES PATENTS

| 3,584,042 | 6/1971 | Yavarsky et al. | 23/115 X |
| 3,592,850 | 7/1971 | Mazzacco et al. | 23/115 X |

OTHER PUBLICATIONS

Goliath et al., Mech. of Reduction of Sulfur Dioxide by Formic Acid Acta Chemica Scand., V. 16, No. 3, 1962, pp. 570–574.

*Primary Examiner*—Vivian Garner
*Attorney*—D. Leigh Fowler, Jr. et al.

[57] ABSTRACT

Sodium, potassium, or ammonium thiosulfate is converted in one stage to the corresponding formate and $H_2S$ by heating the thiosulfate to an elevated temperature above 475°F. in the presence of carbon monoxide, steam, and one of the following: sodium, potassium, and ammonium formates.

7 Claims, 1 Drawing Figure

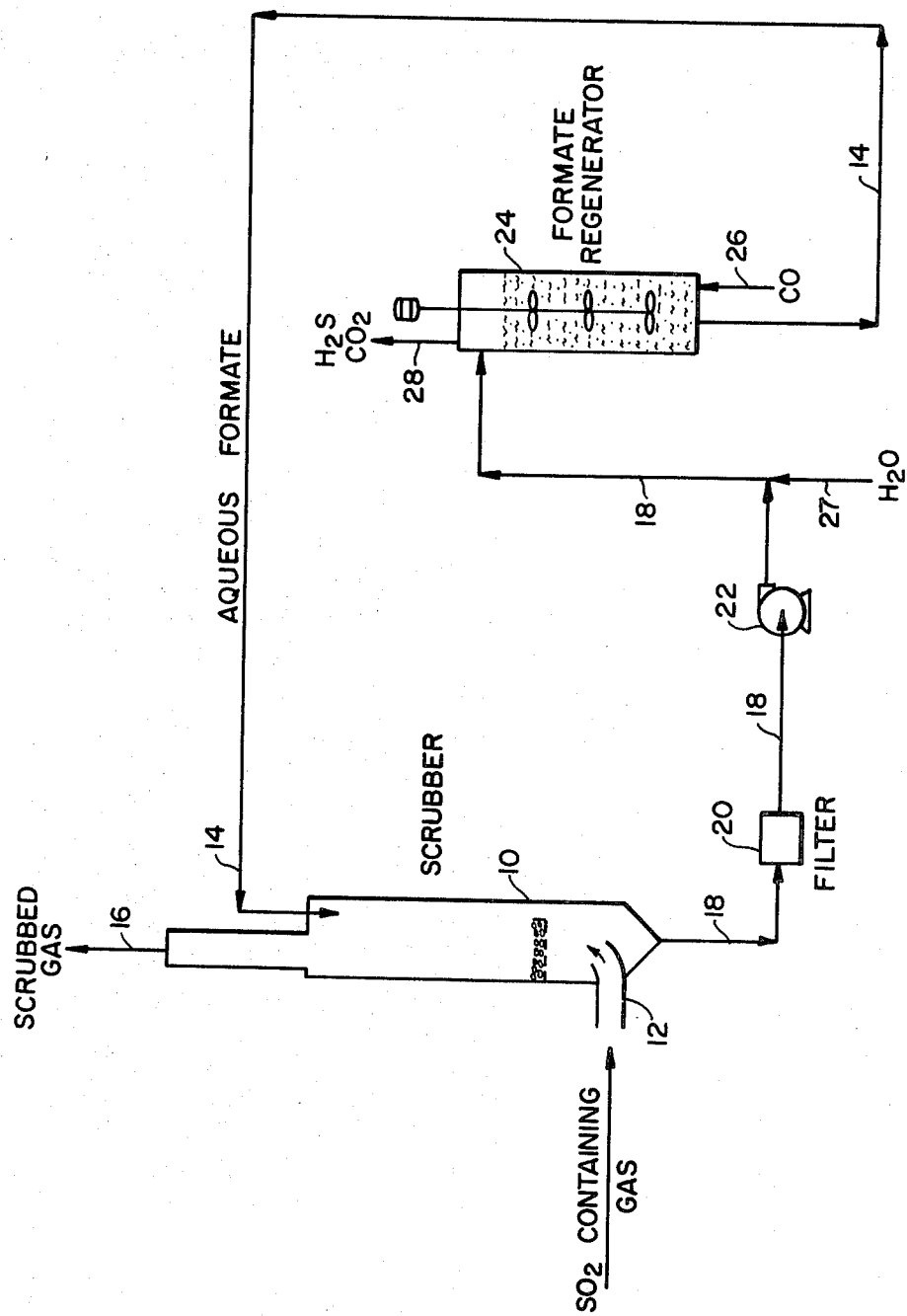

REDUCTION OF AQUEOUS THIOSULFATE SOLUTIONS CONTAINING FORMATE WITH CARBON MONOXIDE

CROSS-REFERENCES TO RELATED APPLICATIONS

This application is a division of application, Serial No. 128,750, filed Mar. 29, 1971, now U.S. Pat. No. 3,687,614 which is a continuation-in-part of application, Ser. No. 879,224, filed Nov. 24, 1969, now U.S. Pat. No. 3,584,042. Application, Ser. No. 879,224 was itself a continuation-in-part of application, Ser. No. 667,479, filed Sept. 13, 1967 (now abandoned).

BACKGROUND OF THE INVENTION

1. Field of the Invention

The present invention relates to the regeneration of spent absorbent used in the removal of sulfur dioxide from gases containing sulfur dioxide, such as flue gases. The absorbent is sodium, potassium, or ammonium formate in the liquid state.

2. Description of the Prior Art

In U.S. Pat. No. 3,584,042, cited above, there is described a two-stage process for regenerating spent absorbent used for removing $SO_2$ from flue gas. The absorbent, which is sodium, potassium, or ammonium formate in a liquid state, absorbs $SO_2$ by reacting with it essentially in accordance with the following Equation 1:

Equation 1. $2\ MCOOH + 2\ SO_2 = M_2S_2O_3 + 2\ CO_2 + H_2O$ where M is Na, K, or $NH_4$ The two-stage process of regeneration effects the reduction of $M_2S_2O_3$ to MCOOH and $H_2S$ in two successive reactions essentially in accordance with the following Equations 2 and 3:

Equation 2. $M_2S_2O_3 + 4\ MCOOH = 3\ M_2CO_3 + 2\ H_2S + CO_2$

Equation 3. $M_2CO_3 + 2\ CO + H_2O = 2\ MCOOH + CO_2$

The foregoing Equations 2 and 3 represent somewhat simplified expressions of what actually occurs. While they do represent the principal conversions, there are "side" reactions, namely:

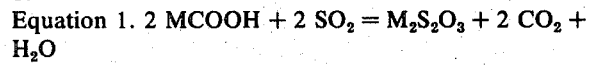
Equation 4. $4\ MCOOH + M_2S_2O_3 = 4\ MHCO_3 + 2\ MSH$

Equation 5. $4\ MCOOH + M_2S_2O_3 = M_2CO_3 + 2\ M_2S + 3\ CO_2 + H_2O$

In U.S. Pat. No. 3,592,850, there is described a three-stage process for regenerating the above-described spent formate absorbent which provides for the conversion of any byproduct MSH and $M_2S$ (see Equations 4 and 5) as well as the conversion of the principal products. An additional stage is provided between the two reduction stages (see Equations 2 and 3). In this additional stage, $CO_2$ and $H_2O$ (steam) are passed through the product from the first reduction stage, to effect stripping of $H_2S$, and the two reactions expressed in the following Equations 6 and 7:

Equation 6. $MSH + CO_2 + H_2O = MHCO_3 + H_2S$
Equation 7. $M_2S + CO_2 + H_2O = M_2CO_3 + H_2S$

SUMMARY OF THE INVENTION

In accordance with the present invention, a process is provided for regenerating, in one stage, partially spent formate absorbent used to remove $SO_2$ from $SO_2$-containing gases. That process comprises passing a CO-containing gas (together with steam, if the absorbent contains no water or insufficient water) through the partially spent absorbent at a temperature above 475°F., preferably in the case of aqueous solutions, between 500° and 600°F. and at a pressure above 500 psi, preferably between 750 psi and 1500 psi. Higher temperatures are used if the absorbent is in a molten state; and the reducing gas also preferably contains hydrogen in such cases.

One of the keys to successful conduct of regeneration in one stage is the conversion of the by-product MSH (see Equation 4) to MOOCH and $H_2S$, as follows:
Equation 8. $MSH + CO + H_2O = MOOCH + H_2S$
This reaction is believed to be new.

The feasibility of single-stage (one-zone) regeneration as depicted by the reaction
Equation 9. $K_2S_2O_3 + 6\ CO + 3\ H_2O \rightarrow 2\ KOOCH + 4\ CO_2 + 2\ H_2S$
was experimentally tested on synthetic spent aqueous potassium formate at a set of conditions known to be collectively suitable for all of the following reactions:
Equation 10. $4\ KOOCH + K_2S_2O_3 + H_2O = 4\ KHCO_3 + 2\ KSH$
Equation 11. $KHCO_3 + KSH = K_2CO_3 + H_2S$
Equation 12. $KSH + CO + H_2O = KOOCH + H_2S$
Equation 13. $K_2CO_3 + 2\ CO + H_2O = 2\ KOOCH + CO_2$
Carbon monoxide, in excess of that required by reaction of Equation 13 was supplied continuously to the thiosulfate-formate solutions: (1) to provide for the ultimate synthesis of formate from the reduction and stripping product, and (2) to act as a vehicle to remove $H_2S$ from the reactor. In one of the runs, $CO_2$ was also fed to assist the intermediate reaction of Equation 11 by, in effect, reducing the decomposition of bicarbonate to carbonate at the reaction temperature.

The results of the experimental demonstration of single-stage regeneration may be summarized as follows: All of the sequential reactions of Equations 10 to 13 inclusive, involved in regeneration of formate from thiosulfate, occurred simultaneously in a single-stage reactor at 536°F. with an inlet CO partial pressure of 580–700 psia. For two hours residence time, the reduction of thiosulfate to sulfides was complete (99.7 percent), the stripping of $H_2S$ from the intermediate KSH was 87 percent complete and synthesis of formate proceeded to 73.5 percent of total regeneration of all potassium into the formate salt. The pressure of added $CO_2$ definitely assisted stripping, making $K_2CO_3$ available for final regeneration to formate by CO reduction. Complete sulfur recovery as $H_2S$ and complete regeneration of formate can likely be obtained by improved gas-liquid contacting in the single-stage reactor because the slower, overall rate-controlling reactions are gas-liquid mass transfer controlled.

The apparatus used for the single-stage regeneration runs consisted of a magnetically stirred, one-liter, batch-loaded autoclave provided with the necessary temperature and pressure controls. The unit included facilities for continuous pressurized gas feed and monitored gas withdrawal, as well as a condenser for returning water back to the pool of liquid in the autoclave. Operationally, the gas flow and stirrer were shut off at the end of the reaction period and the reactor allowed to cool to room temperature. The autoclave was then depressurized, opened, and the product liquid analyzed.

All pertinent conditions and results appear in Table I. The major controlled difference between the two runs is that pure CO was fed in No. 1 run, whereas $CO_2$ and CO were fed in No. 2 run. The synthetic spent formate feed had 33 percent more formate than required for the stoichiometric reduction of the thiosulfate to assure the potential of complete reduction. Also, the solution fed to Run No. 2 contained more water to make sure that sufficient water was retained for consumption as per the reaction of Equation 13.

TABLE I

Single-Stage Regeneration of

KOOCH from $K_2S_2O_3$ with $H_2S$ Recovery

| Conditions | Run No. 1 | Run No. 2 |
|---|---|---|
| Temperature, °F. | 536 | 536 |
| Total Pressure, psig | 960 | 1175 |
| Est.Steam Pressure, psia | 260 | 400 |
| Feed Gas at 410 SCFH | 100% CO | 25% $CO_2$:75% CO |
| Reaction Time, hr. | 2.00 | 2.00 |
| Stirrer Speed, rpm. | 1200 | 1200 |
| Feed Composition, gm | | |
| $K_2S_2O_3$ | 96.00 | 96.00 |
| KOOCH** | 224.00 | 224.00 |
| $H_2O$ | 80.00 | 173.00 |
| Total Charge Weight | 400.00 | 493.00 |
| Product Analysis, gm | | |
| KSH | 28.99 | 7.77 |
| $K_2S_2O_3$ | 1.01 | 0.27 |
| $^1K_2SO_3$ | 1.14 | 0.89 |
| $K_2SO_4$ | 1.14 | 1.04 |
| $KHCO_3$ | 29.16 | 61.76 |
| $K_2CO_3$ | 46.43 | 15.36 |
| $^2KOOCH$ | 190.88 | 227.03 |
| $^3H_2O$ | 59.65 | 129.88 |
| Actual Product Weight | 358.40 | 444.00 |
| $H_2S$-Off | 21.86 | 28.93 |
| Product S Distribution, %S as | | |
| $H_2S$ | 60.1 | 87.4 |
| KSH | 37.6 | 11.1 |
| $K_2S_2O_3$ | 1.0 | 0.3 |
| $K_2SO_3$ | 0.7 | 0.6 |
| $K_2SO_4$ | 0.6 | 0.6 |
| Sulfur Balance (out/in) | 105.8 | 96.2 |
| Results | | |
| % Reduction of $K_2S_2O_3$ | 99.0 | 99.7 |
| % Regeneration of the Reduction-Consumed KOOCH | 80.3 | 101.8 |
| % K in Product as KOOCH | 61.8 | 73.5 |

¹By difference, via S-balance.
²By difference, via K-balance.
³By difference, via Mass-balance.
**167.9 gm KOOCH = requirement for complete reduction of $K_2S_2O_3$.

DESCRIPTION OF DRAWING

For a better understanding of our invention, its objects and advantages, reference should be had to the accompanying drawing in which is shown a schematic flowsheet of the process of our invention.

Referring to the drawing, $SO_2$-containing gas is introduced into the bottom of a scrubber 10 through a conduit 12 while the selected formate (preferably concentrated aqueous potassium formate, e.g. 70–75%) is fed into the top of the scrubber through a conduit 14. The scrubber may be any conventional gas-liquid scrubbing tower designed to assure contact of the $SO_2$-containing gas at elevated temperatures with the selected formate in a liquid state. We prefer to use a jiggling bed of marbles through which the gas and liquid pass in countercurrent flow relationship. The temperature within the scrubber is preferably maintained between 170° and 200°F. when concentrated aqueous potassium formate is the absorbent. This temperature range has the advantage of eliminating the need for reheat of the scrubbed gases when they are released to the atmosphere. The scrubbed gas, freed of $SO_2$, or substantially so, is discharged through a stack 16 as clean stack gas.

The relative amounts of $SO_2$-containing gas and formate passing through the scrubber are regulated to provide for considerable excess of the formate, so that less than 25 percent by weight of the formate is converted to the thiosulfate. Accordingly, the major constituents of the effluent liquid stream leaving the bottom of the scrubber through conduit 18 are aqueous potassium formate and potassium thiosulfate. These are circulated through a filter 20 by a pump 22 to the top of a stirred Formate Regenerator vessel 24 wherein the thiosulfate is reduced in a single stage to the formate by reaction with excess formate and with CO introduced through a conduit 26 into the bottom of the vessel 24. Additional water may be added through a conduit 27 if necessary. The temperature maintained in the Regenerator is about 540°F., and the pressure held at about 1,000 psig. The residence time is about 2 hours. The gaseous product composed of $H_2S$ and $CO_2$ is discharged through a stack 28, while the regenerated aqueous formate is recycled to the scrubber through the conduit 14 after suitable adjustment of its concentration.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. The process which comprises contacting a mixture of a thiosulfate selected from the group consisting of sodium, potassium and ammonium thiosulfates and a formate having the same cation as said thiosulfate with carbon monoxide and water at a temperature above 475°F. and a pressure above 500 psi, whereby $H_2S$, formate, carbonate, and hydrosulfide are obtained in the product.

2. The process according to claim 1 wherein $H_2$ is added to the CO.

3. The process according to claim 1 wherein $CO_2$ is added to the CO.

4. The process according to claim 1 wherein said mixture is in aqueous solution.

5. The process according to claim 4 wherein the temperature is between 500° and 600°F. and the pressure is between 750 and 1,000 psi.

6. The process according to claim 5 wherein the thiosulfate and the formate are the potassium salts.

7. The process which comprises reacting MSH WITH CO and $H_2O$ at a temperature above 475° F and at a pressure above 500 psi, to thereby make MOOCH and $H_2S$, where M is Na, K, or $NH_4$.

* * * * *